Sept. 17, 1940. W. M. GEWIN 2,214,727
JOURNAL WIPER
Filed March 25, 1939
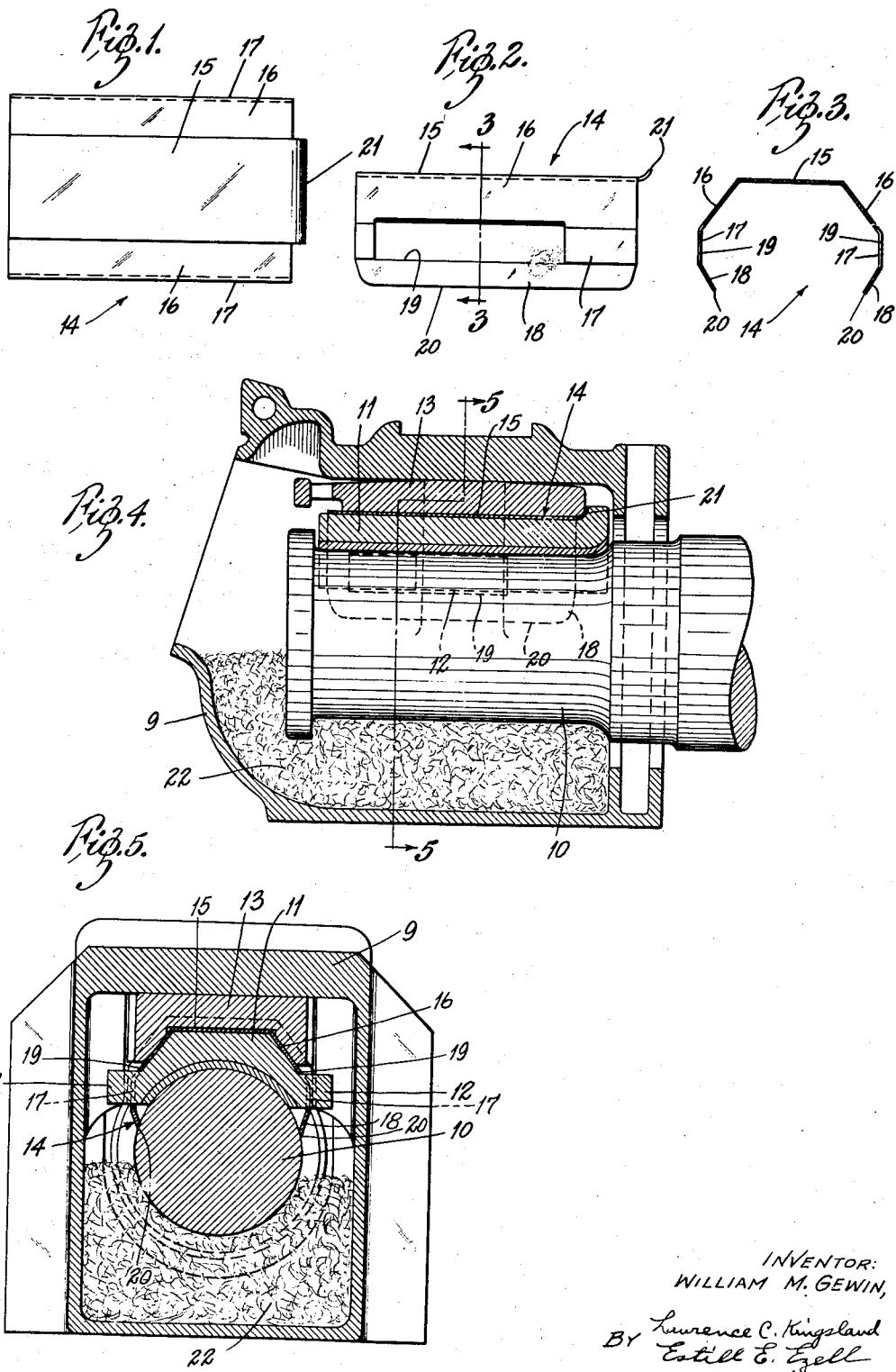
INVENTOR:
WILLIAM M. GEWIN,
BY Lawrence C. Kingsland
Estill E. Ezell
ATTORNEYS Patented Sept. 17, 1940

2,214,727

UNITED STATES PATENT OFFICE 2,214,727

JOURNAL WIPER

William M. Gewin, Dupo, Ill., assignor of one-half to Wilbert G. Wilson, East St. Louis, Ill.

Application March 25, 1939, Serial No. 264,175

1 Claim. (Cl. 308—89)

The present invention relates generally to railway rolling stock equipment, and more particularly to a wiper for cooperating with a journal of a car.

Due to the inherent nature of the construction of railway car journal boxes, it is impossible to keep dirt, grit, sand, and the like, from sifting into them. The oiled waste, or the like, within a box performs an oil wiping action, but it in no wise eliminates the foreign matter which enters the journal box. Therefore, the foreign substances work between the journal brass and the journal, causing friction which mars the moving parts and which ultimately effects a hot box. Further, the waste itself works between the brass and journal. Hot boxes annually take a heavy toll in labor and money, yet, prior to the development of the present invention, nothing was in use on the rolling stock of the railroads to satisfactorily prevent hot boxes.

It is, therefore, an object of the present invention to provide a journal wiper which effectively eliminates hot boxes caused by foreign substances, waste, and the like, getting between the journal brass and journal of a railway car.

Another object of the present invention is to provide a journal wiper which is adapted to keep the journal clean and free from foreign substances.

Another object is to provide a journal wiper which is adapted to be disposed between a journal brass and a journal wedge, and to contact the journal along two longitudinal lines.

Another object is to provide a journal wiper which is adapted to contact the journal along longitudinal lines, to clean foreign substances, yet to permit the passage of a sufficient amount of lubricant.

Another object is to provide a journal wiper of spring sheet metal which contacts the journal throughout substantially the full length thereof to remove foreign substances, and to permit the passage of a sufficient quantity of lubricant.

Another object is to provide a journal wiper which is inexpensive and simple, yet thoroughly efficient to fulfill all of the objects and advantages sought therefor.

Other objects and advantages will be apparent from the following description, taken in conjunction with the accompanying drawing in which:

Fig. 1 is a plan view of a journal wiper constructed in accordance with the teachings of the present invention;

Fig. 2 is a side elevation of the journal wiper shown in Fig. 1;

Fig. 3 is a section on the line 3—3 of Fig. 2;

Fig. 4 is a longitudinal section through a journal box showing an embodiment of the present invention in operative disposition relative to a journal, a journal brass, and a journal wedge; and, Fig. 5 is a section on the line 5—5 of Fig. 4.

Referring to the drawing more particularly by reference numerals, and noting particularly Figs. 4 and 5, there are shown in assembled relation a journal box 9, one journal 10 of a pair of car wheels (not shown), a journal brass 11 having handling portions 12, a journal wedge 13, and a journal wiper 14 constructed in accordance with the teachings of the present invention.

The journal wiper 14 preferably comprises a central flat portion 15 and opposed side portions 16, 17 and 18, disposed according to the configuration shown in Figs. 1-3. There is a longitudinal opening 19 in each of the portions 17 which extends into the respective portion 16. Each of the portions 18 terminates in a square-cut wiping edge 20 which wears in a self-sharpening action to conform to the journal 10. Extending from the central portion 15 is a lip 21 which is adapted to position the wiper 14. The journal wiper 14 is preferably constructed of a single piece of sheet metal of light gauge, the exact configuration being determined by the cross-section of the journal brass and journal wedge (Fig. 5).

The operative disposition of the journal wiper 14 is clear from Figs. 4 and 5. The journal wiper 14 is disposed between the journal brass 11 and the journal wedge 13, the openings 19 extending around the handling projections 12. The wiping edges 20 engage the journal 10.

With the wiper 14 disposed between the journal brass 11 and the journal wedge 13, the wiping edges 20 engage the journal 10 along substantially the full longitudinal extent thereof firmly enough to prevent the passage of sand, grit, waste, and the like, yet lightly enough to prevent scraping all of the lubricant therefrom. Since the wiper 14 is of a resilient metal, the edges 20 will resiliently engage the journal 10, the moving contact of the metal on metal preventing the formation of a seal which would prohibit the passage of oil and which would dry out the journal 10. The resilient engagement of the wiper 14 with the journal 10 permits the edges 20 to remain in engagement therewith even during serious relative movement between the journal 10 and the journal brass 11, which too often occurs when the cars are handled roughly or are subjected to severe shocks. It is this relative movement of the journal 10 and the brass 11 which disturbs waste 22 within the journal box 9, causing a portion of the waste 22 to be moved between the journal brass 11 and the journal 10.

It is apparent, therefore, that the journal wiper 14 is of simple yet very effective construction, and that it is adapted to fulfill all of the objects and advantages sought therefor.

It is to be understood that the foregoing description and accompanying drawing have been given by way of illustration and example and not for purposes of limitation, the invention being limited only by the claim which follows.

What is claimed is:

A journal wiper comprising an integral body formed of resilient sheet metal, and means for maintaining said body in operative disposition to prevent lateral displacement, said maintaining means comprising an upturned lip adapted to lie between an end of a journal wedge and a shoulder of a journal brass, said body including a central portion adapted to be disposed between a journal wedge and a journal brass, and side portions extending at an angle from the central portion in symmetrical relation adapted to extend around and below the journal brass, each side portion including a lower segment free of engagement with the brass, the lower segments being disposed in converging relationship and terminating in free straight edges, said lower segments being of substantial width to block the passage of waste or the like thereover, said free straight edges being spaced apart a lesser distance than the chord length of that portion of a journal adapted to be contacted, said free edges being adapted to contact resiliently and continuously a journal throughout substantially the longitudinal extent thereof to prevent the passage of dirt, sand, and the like, said resilient contact of the free edges providing means to maintain the edges in rounded cross-section in the rocking action of the wedge and journal brass during movement of the car, whereby a sled runner contact is maintained which prevents scraping of all oil from the journal.

WILLIAM M. GEWIN.